(12) United States Patent
Iwakura et al.

(10) Patent No.: US 8,370,276 B2
(45) Date of Patent: Feb. 5, 2013

(54) RULE LEARNING METHOD, PROGRAM, AND DEVICE SELECTING RULE FOR UPDATING WEIGHTS BASED ON CONFIDENCE VALUE

(75) Inventors: Tomoya Iwakura, Kawasaki (JP); Seishi Okamoto, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 841 days.

(21) Appl. No.: 12/507,379

(22) Filed: Jul. 22, 2009

(65) Prior Publication Data

US 2010/0023467 A1 Jan. 28, 2010

(30) Foreign Application Priority Data

Jul. 28, 2008 (JP) ................................ 2008-193068

(51) Int. Cl.
*G06F 15/18* (2006.01)
(52) U.S. Cl. .......................................................... 706/12
(58) Field of Classification Search .................. None
See application file for complete search history.

(56) References Cited

U.S. PATENT DOCUMENTS

2008/0246852 A1* 10/2008 Mori ........................... 348/222.1

OTHER PUBLICATIONS

Aly et al. "Novel methods for the feature subset ensembles approach", AIML, 2006, pp. 7.*
Freund et al. "A Decision-Theoretic Generalization of On-Line Learning and an Application to Boosting", CSS, 55, 1997, pp. 119-139.*
Y. Freund et al., "The alternating decision tree learning algorithm", Proceedings of the Sixteenth International Conference on Machine Learning, 1999, pp. 124-133.
R.E. Schapire et al., "Improved Boosting Algorithms Using Confidence-rated Predictions", Machine Learning, vol. 37, No. 3, 1999, pp. 297-336.
R.E. Schapire et al., "BoosTexter: A Boosting-based System for Text Categorization", Machine Learning, vol. 39, No. 2/3, 2000, pp. 135-168.
Gerard Escudero et al., "Boosting Applied to Word Sense Disambiguation", Proceedings of the 11th European Conference on Machine Learning , 2000, pp. 129-141.
J. Ross Quinlan, C4.5: Programs for Machine Learning, Morgan Kaufmann Series in Machine Learning, 1993, pp. 16-26.
Taku Kudo et al., "A Boosting Algorithm for Classification of Semi-Structured Text", Proceedings of the Conference on Empirical Methods in Natural Language, 2004, pp. 301-308.
Taku Kudo et al., "An Application of Boosting to Graph Classification", Pro-ceedings of Neural Information Processing Systems 2004, Advances in Neural Information Processing Systems 17, 2005, pp. 729-736.

*Primary Examiner* — Jeffrey A Gaffin
*Assistant Examiner* — Li-Wu Chang
(74) *Attorney, Agent, or Firm* — Staas & Halsey LLP

(57) ABSTRACT

A rule learning method in machine learning includes distributing features to a given number of buckets based on a weight of the features which are correlated with a training example; specifying a feature with a maximum gain value as a rule based on a weight of the training example from each of the buckets; calculating a confidence value of the specified rule based on the weight of the training example; storing the specified rule and the confidence value in a rule data storage unit; updating the weights of the training examples based on the specified rule, the confidence value of the specified rule, data of the training example, and the weight of the training example; and repeating the distributing, the specifying, the calculating, the storing, and the updating, when the rule and the confidence value are to be further generated.

5 Claims, 13 Drawing Sheets

| LABEL | WEIGHT | FEATURE | | |
|---|---|---|---|---|
| +1 | 1 | a | b | c |
| −1 | 1 | c | d | |
| +1 | 1 | a | c | |
| +1 | 1 | a | b | |

FIG. 3

| | |
|---|---|
| a | 3 |
| b | 2 |
| c | 3 |
| d | 1 |

FIG. 4

| a | 3 |
|---|---|
| c | 3 |
| b | 2 |
| d | 1 |

FIG. 5

BUCKET 1 — a, b
BUCKET 2 — c, d

FIG. 6

BUCKET 1

| RULE CANDIDATE | GAIN |
|---|---|
| a | $\sqrt{3}$ |
| b | $\sqrt{2}$ |

FIG. 7

| LABEL | WEIGHT | LEARNING CASE | | |
|---|---|---|---|---|
| +1 | 0.27 | a | b | c |
| −1 | 1 | c | d | |
| +1 | 0.27 | a | c | |
| +1 | 0.27 | a | b | |

FIG. 8

BUCKET 2

| RULE CANDIDATE | GAIN |
|---|---|
| c | 0.25 |
| d | 1 |

FIG. 9

| LABEL | WEIGHT | LEARNING CASE | | |
|---|---|---|---|---|
| +1 | 0.27 | a | b | c |
| −1 | 0.44 | c | d | |
| +1 | 0.27 | a | c | |
| +1 | 0.27 | a | b | |

FIG. 10

BUCKET 1

| RULE CANDIDATE | GAIN |
|---|---|
| a | 0.91 |
| b | 0.74 |

FIG. 11

| a | 1.28 |
|---|---|
| d | −0.81 |
| a | 0.73 |

| a | 0.81 |
|---|---|
| b | 0.54 |
| c | 0.98 |
| d | 0.44 |

BUCKET 1

| FEATURE | GAIN |
|---------|------|
| b | 0.73 |
| c | 0.07 |

RULE LEARNING METHOD, PROGRAM, AND DEVICE SELECTING RULE FOR UPDATING WEIGHTS BASED ON CONFIDENCE VALUE

CROSS-REFERENCE TO RELATED APPLICATIONS

This application is based upon and claims the benefit of priority of the prior Japanese Patent Application No. 2008-193068, filed on Jul. 28, 2008, the entire contents of which are incorporated herein by reference.

FIELD

The present invention relates to a high speed technique for rule learning in machine learning.

BACKGROUND

Various machine learning algorithms are known including machine learning algorithms known as "boosting" algorithms. A learning method based on an AdaBoost method, which is a type of boosting algorithm, is outlined below. Hereinafter, unless otherwise described, boosting refers to AdaBoost.

The related documents in this field include the following: Y. Freund and L. Mason, 1999, "The alternating decision tree learning algorithm", In Proc. of 16th ICML, pp. 124-133; R. E. Schapire and Y. Singer, 1999, "Improved boosting algorithms using confidence-rated predictions", Machine Learning, 37 (3): 297-336; R. E. Schapire and Y. Singer, 2000, "Boostexter: A boosting-based system for text categorization", Machine Learning, 39 (2/3): 135-168; and Gerard Escudero, Llu'is M'arquez, and German Rigau, 2000, "Boosting applied to word sense disambiguation", In Proc. of 11th ECML, pp. 129-141.

In the boosting, a plurality of weak hypotheses (i.e., rules) are generated from training examples with different weights with the use of a given weak learner. While changing the weight of the training example, the weak hypotheses are repeatedly generated from the training examples, and thus a final hypothesis, which is a combination of the weak hypotheses, is finally generated. A small weight is assigned to a case which can be correctly classified by a previously learned weak hypothesis, while a large weight is assigned to a case which cannot be correctly classified.

This description is based on a boosting algorithm using a rule learner as the weak learner. Hereinafter, such an algorithm is described as a boosting algorithm. The premise of the boosting algorithm will be hereinafter described.

First, a problem addressed by the boosting algorithm will be described. Here, x is assumed to be a set of examples, and a treated label set is assumed to be y={−1, +1}. The object of learning is to derive a mapping F: x→y from learning data S={(x1, y1), ..., (xm, ym)}.

Here, |x| is assumed to be a kind of feature included in a case x∈x. xi∈x ($1 \leq i \leq m$) is assumed to be a feature set comprising |xi| kinds of features. The feature set comprising "k" features is described as "k−feature set". Further, yi∈y is a class level of the i-th feature set of S.

FT={f1, f2, ..., fM} is assumed to be "M" kinds of features which are the objects of the boosting algorithm. Each feature of each case xi is $x_{i,j} \in FT$ ($1 \leq j \leq |xi|$). The boosting algorithm can handle a binary vector; however, in the following example, each feature is represented by a character string.

A case where a feature set includes another feature set is defined as follows:

Definition 1:

In two feature sets x and x', when x' has all features of x, x is called a partial feature set of x', and is described as follows:

$$x \subseteq x'$$

Further, the rule is defined based on the concept of real-valued prediction and abstaining (RVPA) used in "Boostexter: A boosting-based system for text categorization", Machine Learning, 39 (2/3): 135-168, 2000 by R. E. Schapire and Y. Singer. In RVPA, when an input feature set fits the conditions, a confidence value represented by a real number is returned; but when an input feature set does not fit the conditions, "0" is returned. The weak hypothesis for classification of the feature sets is defined as follows:

Definition 2:

A feature set "f" is a rule, and "x" is the input feature set. When a real number "c" is the confidence value of the rule "f", the application of the rule is defined as follows:

$$h_{(f,c)}(x) = \begin{cases} c & f \subseteq x \\ 0 & \text{otherwise} \end{cases}$$

In the rule learning based on the boosting, a combination of "T" kinds of rule feature sets and the confidence value (<f1, c1>, ..., <fT, cT>) are obtained by learning using the weak learner in "T" number of Boosting rounds, and thus "F" is defined as follows:

$$F(x) = \text{sign}\left(\sum_{t=1}^{T} h_{(f_t, c_t)}(x)\right)$$

wherein, when "x" is not less than 0, sign (x) represents a function of 1, and in other cases the sign (x) represents a function of −1.

The weak learner derives a rule "ft" and the confidence value "ct" with the use of the learning data S {(x1, y1) ($1 \leq i \leq m$) and the weight {wt,1, ..., wt,m} of each training example at the "t"-th boosting round, wt,1(0<wt,1) is the weight of the "t"-th ($1 \leq t \leq T$) boosting round in the "i"-th ($1 \leq i \leq m$) case (x1, y1).

The weak learner selects, as the rule, the feature set "f" and the confidence value "c" minimizing the following formula based on the given learning data and the weight of the training example:

$$\sum_{y \in \{-1,+1\}} W_{t,y}(f) * \exp(-y * h_{(f,c)}(x_i)) + W_t(\neg f) \qquad (1)$$

$$W_{t,y}(f) = \sum_{i=1}^{m} w_{t,i} [[f \subseteq x_i \wedge y_i = y]]$$

$$W_t(\neg f) = \sum_{i=1}^{m} w_{t,i} - W_{t,+1}(f) - W_{t,-1}(f)$$

wherein, when a proposition π is satisfied, [[π]] is 1, and [[π]] is 0 otherwise.

The formula (1) is used as the reference of selection of the rules, because the upper bound of training error of the learning algorithm based on the boosting is associated with the sum of the weights of the examples.

When the formula (1) is minimized by a certain rule "f", the confidence value "c" at that time is as follows:

$$c = \frac{1}{2}\ln\left(\frac{W_{t,+1}(f)}{W_{t,-1}(f)}\right) \quad (2)$$

The formula (2) is substituted into the formula (1), whereby the following formula is obtained:

$$\sum_{i=1}^{m} w_{t,i} - \left(\sqrt{W_{t,+1}(f)} - \sqrt{W_{t,-1}(f)}\right)^2 \quad (3)$$

Based on the formula (3), the minimization of the formula (1) is understood to be equivalent to selecting the feature set "f" maximizing score to be defined as follows:

$$\text{score}(f) \stackrel{\text{def}}{=} \left|\sqrt{W_{t,+1}(f)} - \sqrt{W_{t,-1}(f)}\right| \quad (4)$$

Next, a processing for updating the weight of each case with the use of (ft, ct) will be described. There are two cases where the weight is normalized so that the sum of all weights is 1, and where the weight is not normalized.

When the weight is normalized, a weight wt+1, i in the "t+1"-th round is defined as follows:

$$w_{t+1,i} = \frac{w_{t,i}\exp(-y_i h_{\langle f_t, c_t\rangle}(x_i))}{Z_t} \quad (5)$$

$$Z_t = \sum_{i=1}^{m} w_{t,i}\exp(-y_i h_{\langle f_t, c_t\rangle}(x_i))$$

When the weight is not normalized, the weight wt+1, i in the "t+1"-th round is defined as follows:

$$w_{t+1,i} = w_{t,i}\exp(-y_i h_{\langle f_t, c_t\rangle}(x_i)) \quad (6)$$

An initial value w1, i of the weight to be normalized is "1/m" (where m is the number of the training examples), and the initial value w1,i of the un-normalized weight is 1.

When the appearances of the feature are sparse (the feature appears in few examples), $W_{t,+1}(f)$ or $W_{t,-1}(f)$ is a very small value or 0. In order to avoid that, a value $\epsilon$ for smoothing is introduced.

Namely, the formula (2) is transformed as follows:

$$c = \frac{1}{2}\ln\left(\frac{W_{t,+1}(f)+\epsilon}{W_{t,-1}(f)+\epsilon}\right) \quad (7)$$

For example, $\epsilon=1/m$ or $\epsilon=1$ may be used.

In the basic boosting described above, when the number of candidates of the rules (that is, the number of features) and the generation frequency of the rules (that is, the number of rounds of repetition processing) are large, the learning time becomes very long, leading to a problem.

Therefore, a method where learning is performed using only a part of the rule candidates has been considered. For example sets of rule candidates (also called buckets) are previously generated on the scale of frequency and entropy, and one rule is selected from one set in each round. Hereinafter, the processing contents of this method will be described using FIGS. 1 to 11.

Figure 1:
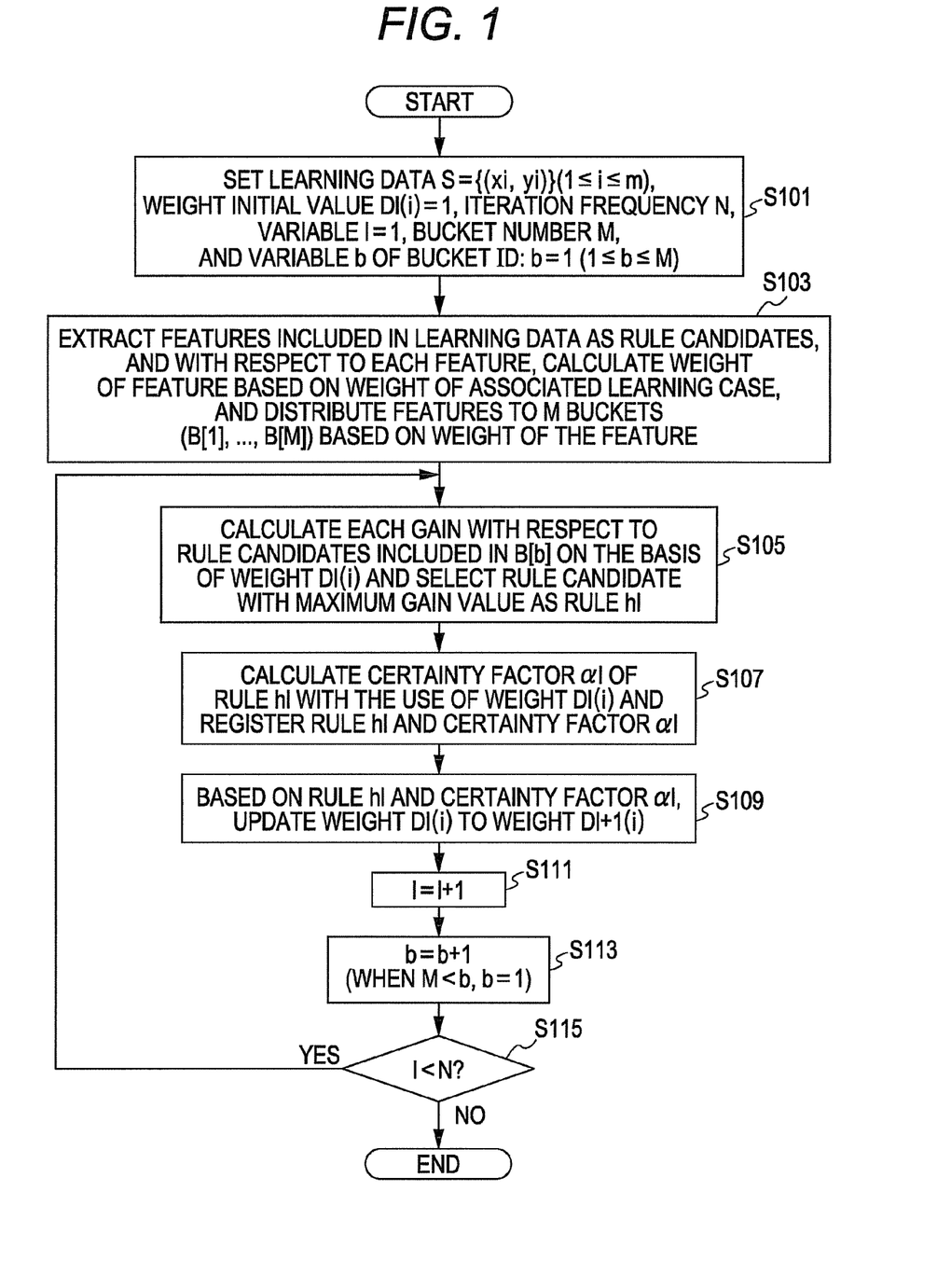
FIG. 1 is a processing flow chart of a well-known technique.
Figure 2:
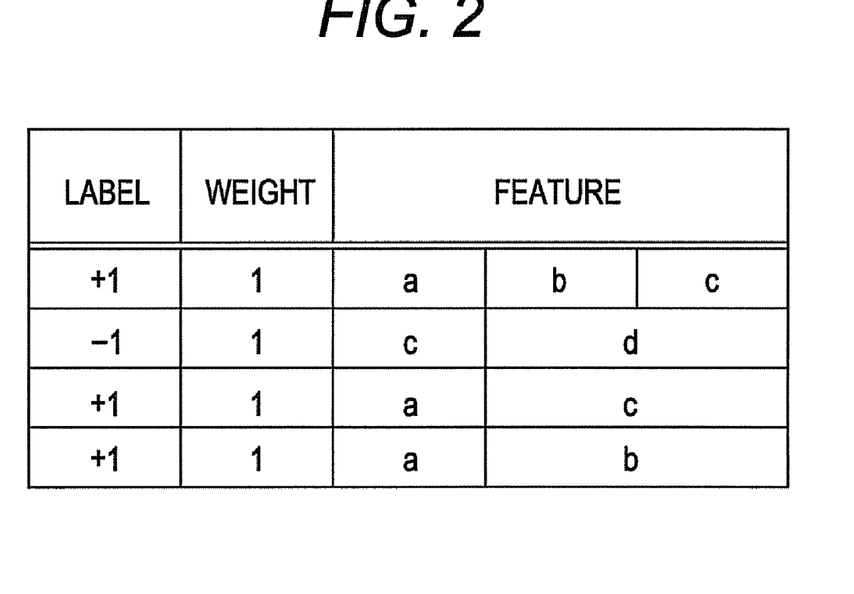
FIG. 2 is an example of learning data.

First, the learning data "S" including "m" number of examples, which are combinations of the feature set "xi" including one or more features and a label "yi" of −1 or +1: S={(x1, y1), (x2, y2), . . . , (xm, ym)}, an initial value DI(i)=1 (1≦i≦m) of "m" number of weights corresponding to "m" number of examples, an iteration frequency "N", a variable I=1 for counting the frequency of iterations, the number of buckets "M" (set of rule candidates), and a variable b=1 (1≦b≦m) of a bucket ID are set (at S101). In order to promote understanding, an example of processing the learning data in FIG. 2 will be described. FIG. 2 includes four training examples. The first training example includes the feature set including features "a", "b", and "c" and a label +1, and the weight of the first training example is 1. The second training example includes the feature set including features "c" and "d" and the label −1, and the weight of the second training example is 1. The third training example includes the feature set including features "a" and "c" and the label +1, and the weight of the third training example is 1. The fourth training example includes the feature set including features "a" and "b" and the label +1, and the weight of the fourth training example is 1.

Figure 3:
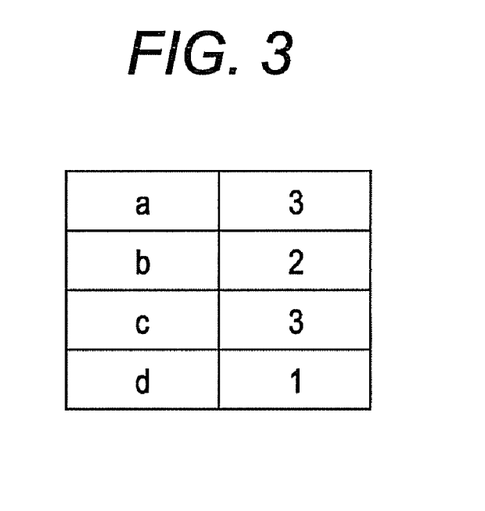
FIG. 3 is examples of weights of features.
Figure 4:
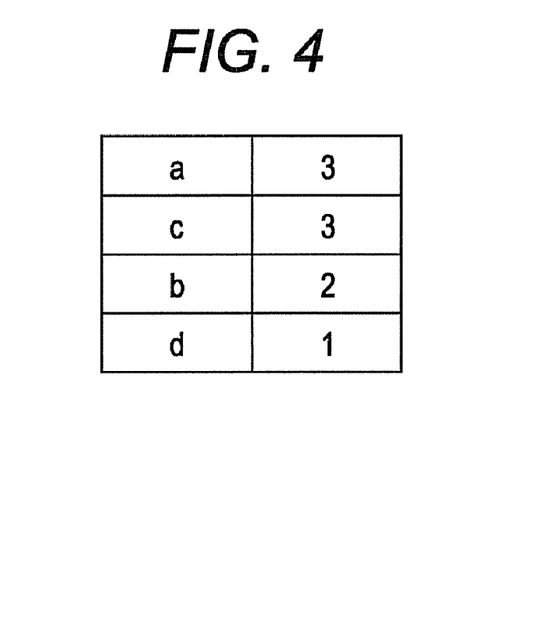
FIG. 4 is a sorting result corresponding to the weights of the features.
Figure 5:
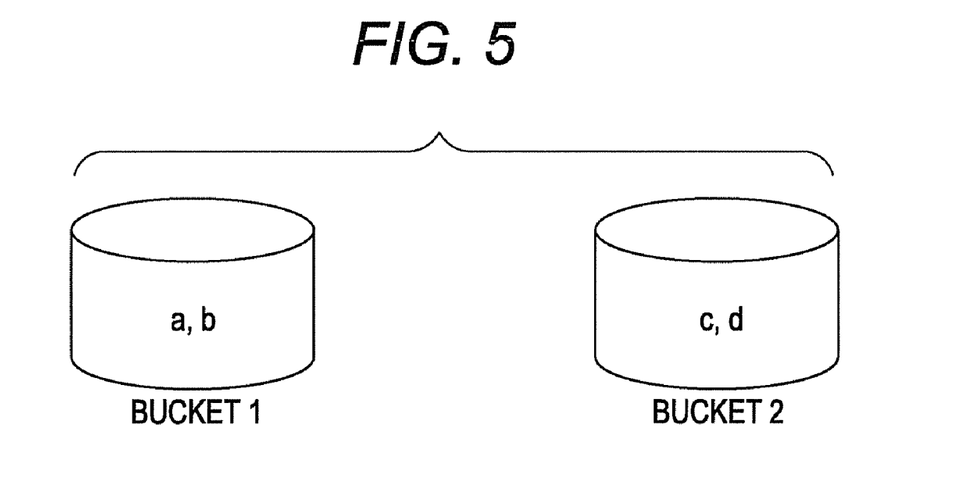
FIG. 5 is a configuration example of buckets of a well-known technique.

Next, the features included in the learning data "S" are extracted as the rule candidates. The weight of each of the features is calculated from the weight of the associated training example, and the features are distributed to "M" number of buckets (B[1], . . . B[M]) based on the weight of the relevant feature (at S103). The feature "a" is included in the feature set in the first, third and fourth training examples. The weights in those training examples are added to each other, whereby the weight of the feature "a" equals 3. Likewise, the feature "b" is included in the feature set in the first and fourth training examples. The weights in those training examples are added to each other, whereby the weight of the feature "b" equals 2. The feature "c" is included in the feature set in the first, second, and third training examples. The weights in those training examples are added to each other, whereby the weight of the feature "c" equals 3. The feature "d" is included in the feature set in the second training examples. The weights in those training examples are added to each other, whereby the weight of the feature "d" equals 1. These results are compiled so that the features and the weights of the features depicted in FIG. 3 are obtained. The features are sorted in descending order based on the weights of the features, and the result depicted in FIG. 4 is obtained. Thus, the order of "a", "c", "b", and "d" is obtained. If M=2, the features "a", "c", "b", and "d" are alternately distributed to the buckets 1, 2, 1, and 2 respectively. Thus, as depicted in FIG. 5, the bucket 1 includes the features "a" and "b", and the bucket 2 includes the features "c" and "d".

Next, a gain of the rule candidates (that is, the features) included in a bucket B[b] is calculated according to a weight "DI(i)", and the rule candidate with a maximum gain value is selected as a rule "hl" (at S105). The gain is defined as follows with respect to a rule candidate "f":

$$\text{gain}(f)=|\text{sqrt}(W(f,+1),\text{sqrt}(W(f,-1))|$$

Here, "W(f, LABEL)" is the sum of the training examples, where the rule candidate "f" appears and the "LABEL" is +1 or −1. "sqrt(x)" represents x1/2, and |x| represents an absolute value of "x".

Figure 6:
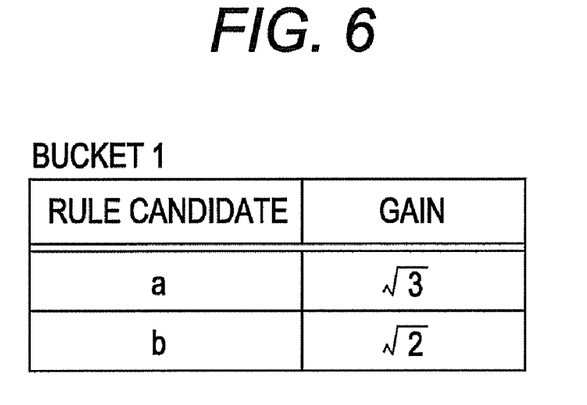
FIG. 6 is a result of calculation of a gain in a bucket 1.

For example, when the rule candidates "a" and "b" included in the bucket 1 are processed, according to FIG. 2, gain(a)=|sqrt(3)−sqrt(0)|=31/2. Likewise, gain(b)=|sqrt(2)− sqrt(0)|=21/2. These results are compiled as depicted in FIG. 6. Thus, the rule candidate "a" with a gain larger than the gain of the rule candidate "b" is selected as the rule "h1".

Next, a confidence value "α1" of the rule "h1" is calculated using the weight "DI(i)", and the rule "I" and the confidence value "α1" are registered in a rule data storage unit (at S107). The confidence value "α1" is calculated based on the formula (7); however, c=α1. For example, the confidence value of the rule "a" is calculated to be "1.28".

Further, the weight "DI(i)" is updated to a weight "DI+1(i)" based on the rule "h1" and the confidence value "α1" (at S109). The weight for the next stage is calculated by the formula (5) or (6). When the formula (6) is used, the weights depicted in FIG. 2 are updated to the weights depicted in FIG. 7. Also, wt,i=DI(i). The weights in the first, third, and fourth training examples are updated to 0.27.

Then, "I" is incremented by one (at S111), and "b" is incremented by one (at S113). However, when "M" is less than "b", "b" is returned to 1.

Thereafter, whether "I" is smaller than "N" or not is judged (at S115). If "I" is smaller than "N", the processing returns to S105. Meanwhile, if "I" is larger than "N", the processing is terminated.

Figure 8:
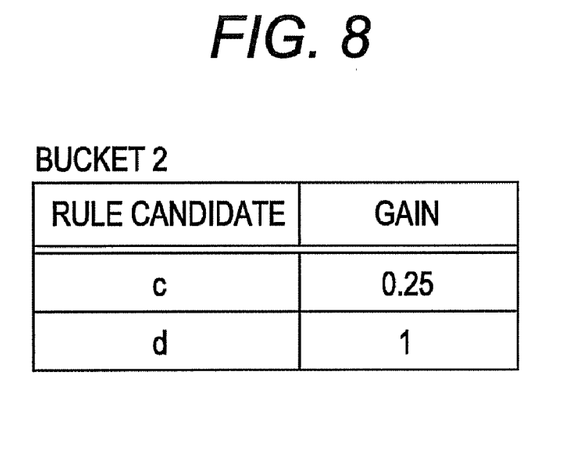
FIG. 8 is a result of calculation of a gain in a bucket 2.

In the above example, after shifting to the processing of B[2], when each gain of the rule candidates "c" and "d" included in the bucket 2 is calculated, the values depicted in FIG. 8 are obtained. Gain(c)=|sqrt(0.54)−sqrt(1)|=0.25, and gain(d)=|sqrt(0)−sqrt(1)|=1. According to this result, the rule candidate "d" is selected as a rule "h2".

Figure 9:
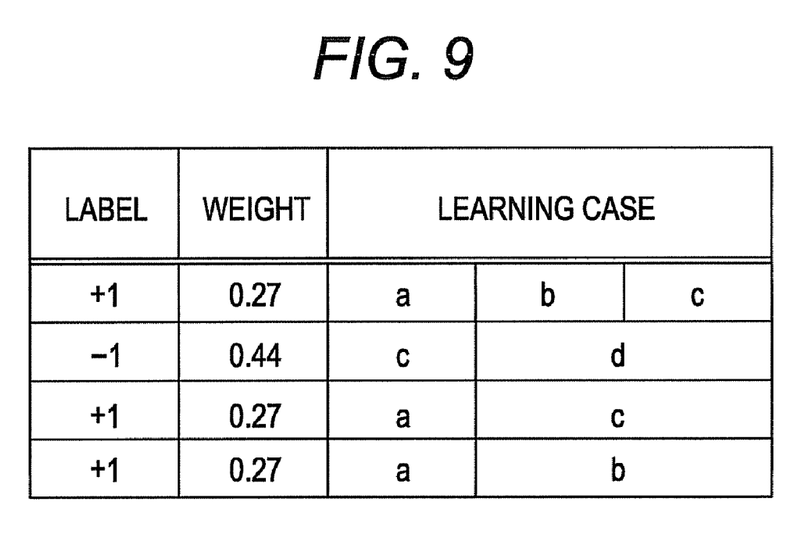
FIG. 9 is an example of updating the weights based on a result of a second Boosting round.

Next, the confidence value of the rule "d" is calculated in accordance with the formula (7), whereby −0.81 is obtained. When the weight of the training example at the next stage is calculated in accordance with the formula (6), using the rule "d" and the confidence value of −0.81, the value depicted in FIG. 9 is obtained. Only the weight of the second training example including the feature "d" is updated to 0.44.

Figure 10:
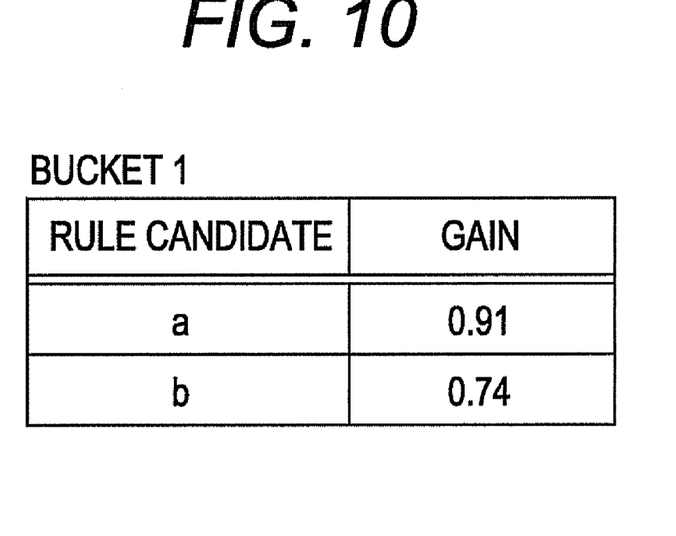
FIG. 10 is a result of calculation of a gain in the bucket 1.

Further, after shifting to the processing of B[1], when each gain of the rule candidates "a" and "b" included in the bucket 1 is calculated, the values depicted ins FIG. 10 are obtained. Also in this case, the feature "a" has a larger gain, and therefore, the feature "a" is selected as the rule. The confidence value of the rule "a" is calculated in accordance with the formula (7), whereby 0.73 is obtained.

Figure 11:
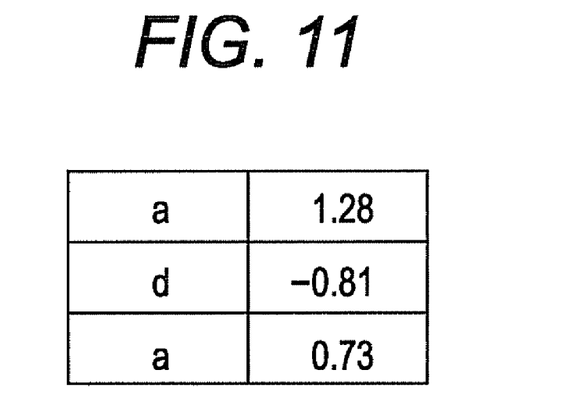
FIG. 11 is a table of pairs of a rule and a confidence value stored in a rule data storage unit, according to a well-known technique.

According to the above processing, pairs of the rule and the confidence value registered in the rule data storage part are depicted in FIG. 11.

When the learning is finished, and in the classification (that is, in the judgment determining whether a case is −1 or +1), the following processing is performed. Namely, when "a b e" is input as an input example, the sum of the confidence values=1.28+0.73=2.01 is obtained from the first and third records of FIG. 11. When the sum of the confidence values is positive, "abe" is classified as +1.

Meanwhile, when "d e" is input as the input example, the sum of the confidence values=−0.81 is obtained from the second record of FIG. 11. When the sum of the confidence values is negative, "de" is classified as −1.

SUMMARY

According to an aspect of the invention, a rule learning method, which makes a computer execute a rule learning processing in machine learning, includes distributing features to a given number of buckets based on a weight of the features, which are registered in a training example data storage storing a plurality of the training examples correlated with one or more of the features, and a weight of the training example; specifying, as a rule, a feature with a maximum gain value based on the weight of the training example from each of the buckets; calculating a confidence value of the specified rule based on the weight of the training example; storing a combination of the specified rule and the confidence value in a rule data storage unit; updating the weights of the learning based on the specified rule, the confidence value of the specified rule, data of the training example, and the weight of the training example; and repeating the distributing, the specifying, the calculating, the storing, and the updating, when the rule and the confidence value are to be further generated after the updating is applied to all the buckets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described in the background art, a plurality of sets of rule candidates (also called buckets) are previously generated on the scale of frequency and entropy, and one rule is selected from one set in each round. When the steps S105 to S115 of FIG. 1 are repeated, the rules "a" and "d" are continuously selected, but the rule candidates "b", "c", and "e" are not selected. Namely, the objects of learning are biased due to the dependence of the distribution processing to the first bucket. Thus, even if the classification accuracy with respect to the first to fourth training examples is 100%, the rule candidates "b", "c", and "e" are never selected, and thus the rule is not generated. Thus, when the input example of "be" is input, the sum of the confidence value is 0, and "be" is not appropriately classified. However, when the sum of the confidence value is 0, it is previously determined that the sum of the confidence value is +1 or −1.

In addition to the method depicted in FIG. 1, there are (1) a method of learning only using the rule candidates appearing more than a given number of times, and (2) a method of randomly selecting the rule candidates in each round. However, in the method (1), there is a problem that there are unlearned rule candidates. Meanwhile, in the method (2), although different rule candidates are selected in each round, there is no reproducibility of learning.

As described above, in the prior art, the rule candidates to be learned are biased, and there may be no reproducibility of learning.

In this invention, the rule is learned so that the bias of learning is eliminated while maintaining the reproducibility in the boosting algorithm.

Figure 12:
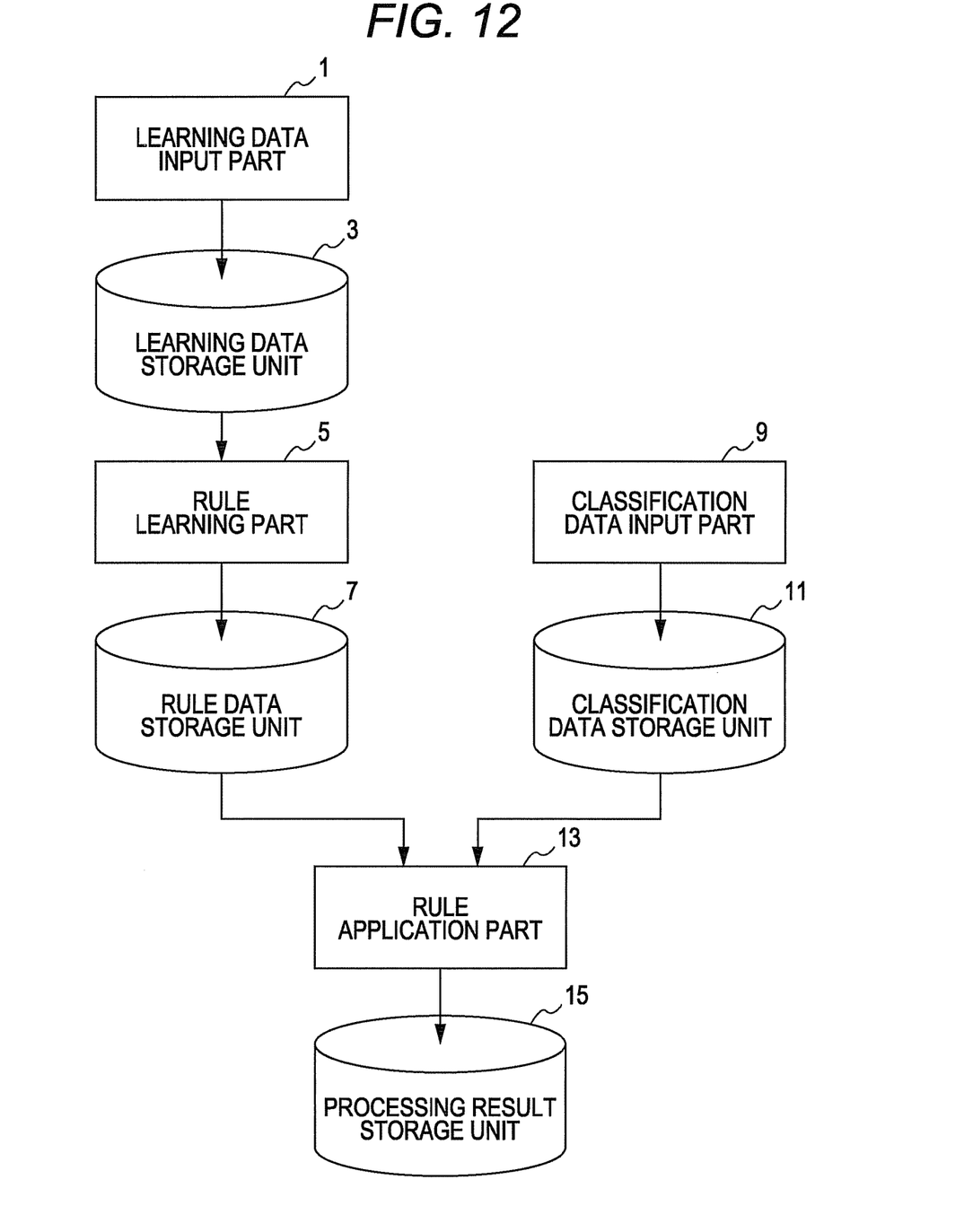
FIG. 12 is a block diagram of a system in an embodiment of the present invention.

Hereinafter, an embodiment of this invention will be described. FIG. 12 is a functional block diagram of a system in the present embodiment. This system has a learning data input part 1 for inputting the learning data; a learning data storage unit 3 for storing the learning data input by the learning data input part 1; a rule learning part 5 for carrying out a main processing in the present embodiment with the use of the data stored in the learning data storage unit 3; a rule data storage unit 7 for storing rule data that is the processing result of the rule learning part 5; a classification data input part 9 for inputting classification data which is an object to be classified by using a generated rule; a classification data storage unit 11 for storing the classification data input by the classification data input part 9; a rule application part 13 for applying the rule data stored in the rule data storage unit 7 to the data to be processed which is stored in the classification data storage unit 11, and performing classification; and a processing result storage unit 15 for storing the processing result of the rule application part 13.

The rule application part 13 performs the above-described mapping F:x→y, where "x" represents an instance space, and "y" represents a label set. The processing contents of the rule application part 13 are substantially the same as the conventional art. If the rule data to be stored in the rule data storage unit 7 and the classification data stored in the classification data storage unit 11 by the classification data input part 9 are provided, the processing is performed in a conventional manner. Likewise, the processing result is stored in a conventional manner. Namely, when the sum of the confidence values of the rules corresponding to the features included in "x" is positive, the features are classified as +1; and when the sum of the confidence values of the rules corresponding to the features included in "x" is negative, the features are classified as −1. Therefore, the description will be hereinafter omitted.

Next, the processing contents of the rule learning part 5 and the like in the present embodiment will be described using FIGS. 13A to 18.

In response to an instruction from a user, for example, the learning data input part 1 accepts the inputs regarding the learning data S={(x1, y1), (x2, y2), ... (xm, ym)} including "m" number of examples which are the combinations of the feature set "xi" including one or more features, and the label "yi" of −1 or +1, the initial value DI(i)=1 of "m" number of weights corresponding to the "m" number of examples, the iteration frequency "N", the variable "I" for counting the number of iterations: I=1, the number of buckets "M", and the variable "b" of bucket ID: b=1 ($1 \leq b \leq m$). These inputs are stored in the learning data storage unit 3 (at S1). Note that for comparison purposes, the example used in the background art is used as is in the present embodiment. Namely, the same learning data depicted in FIG. 2 will be used.

The rule learning part 5 extracts, as the rule candidates, the features included in the learning data "S" to calculate the weights of each of the features from the weight of the associated training example, and, to distribute the features to "M" number of buckets (B[1], ... B[M]) based on the weight of the relevant feature (at S3). The weights of the features are calculated in a way that is similar to the background art. Thus, the features and the weights of the features in FIG. 3 are obtained. The features are sorted in descending order based on the weights of the features, and the result in FIG. 4 is obtained. Thus, the order of "a", "c", "b", and "d" is obtained. Since M=2, the features "a", "c", "b", and "d" are alternately distributed to the buckets 1, 2, 1, and 2 respectively. Thus, the bucket 1 includes the features "a" and "b", and the bucket 2 includes the features "c" and "d", as depicted in FIG. 5.

Next, the rule learning part 5 calculates a gain of the rule candidates (that is, the features) included in the buckets B[b] based on the weight DI(i) ($1 \leq i \leq m$), and selects the rule candidate with the maximum gain value as the rule "hI" (at S5). The gain is calculated in substantially the same way as the background art. The calculation result of the gain is depicted in FIG. 6. Thus, the rule candidate "a" with a gain larger than the gain of the rule candidate "b" is selected as the rule "hI".

Next, the rule learning part 5 calculates the confidence value "αI" of the rule "hI" with the use of the weight "DI(i)" and registers the rule "hI" and the confidence value "αI" in the rule data storage unit 7 (at S7). The confidence value αI is calculated in accordance with the formula (7). For example, the confidence value of the rule "a" is calculated to be 1.28.

Figure 7:
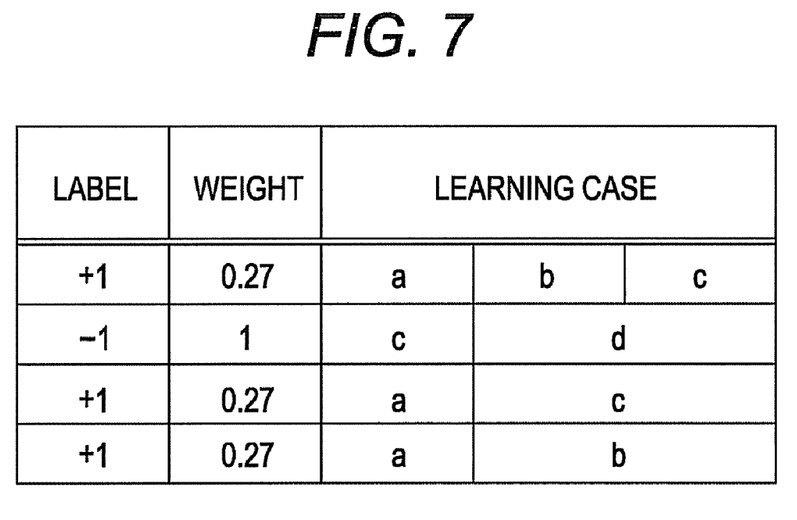
FIG. 7 is an example of updating the weights based on a result of a first Boosting round.

Further, the rule learning part 5 updates the weight "DI(i)" to the weight "DI+1(i)" based on the rule "hI" and the confidence value "αI" (at S9). The weight for the next stage is calculated by the formula (5) or (6). When the formula (6) is used, the weights in FIG. 2 are updated to the weights as depicted in FIG. 7.

Thereafter, the rule learning part 5 increments "I" by one (at S11), and, increments "b" by one (at S13). The processing then shifts to the processing of FIG. 13B.

Figure 13A:
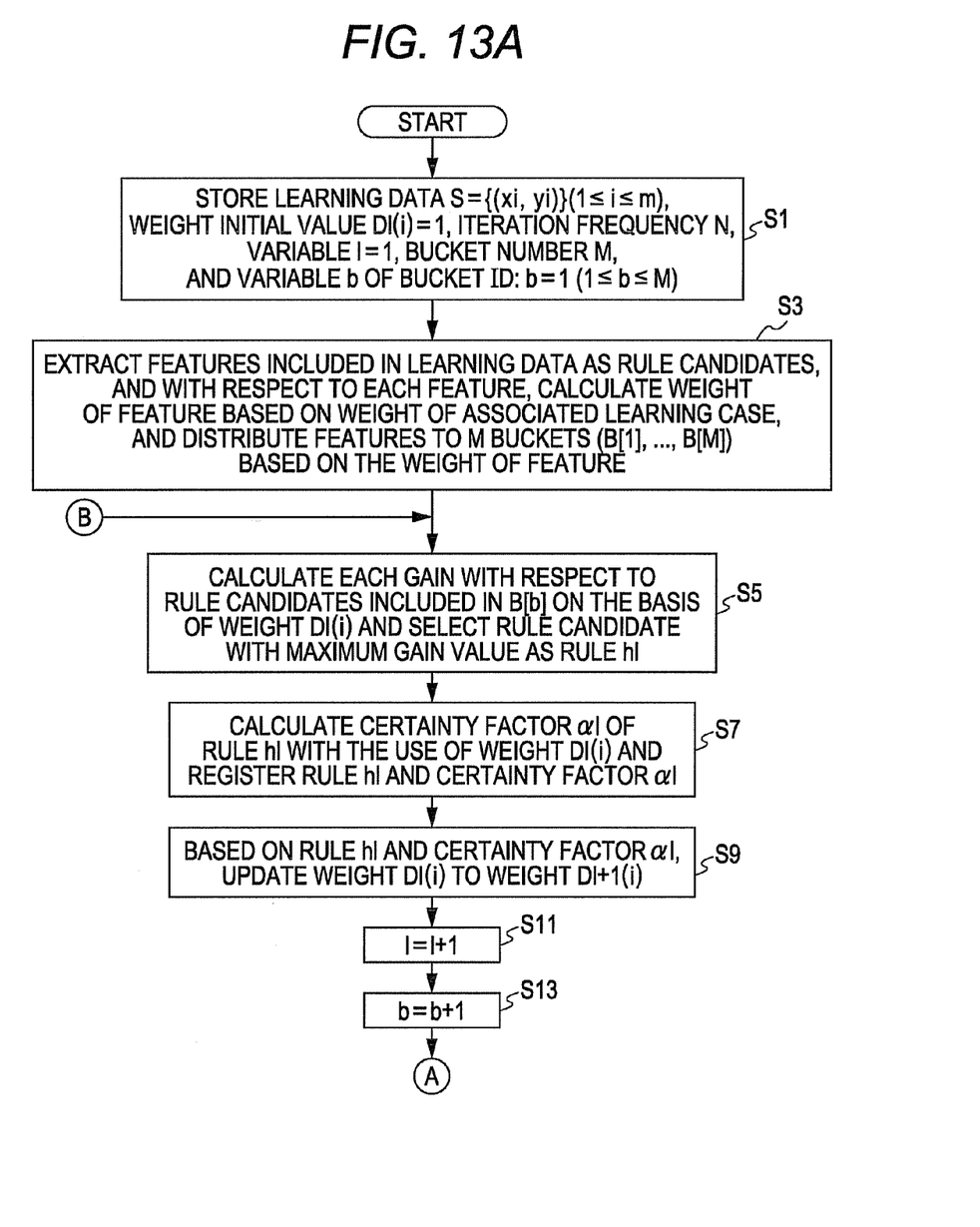
FIGS. 13A and 13B are main processing flow charts in the embodiment of the present invention.
Figure 13B:
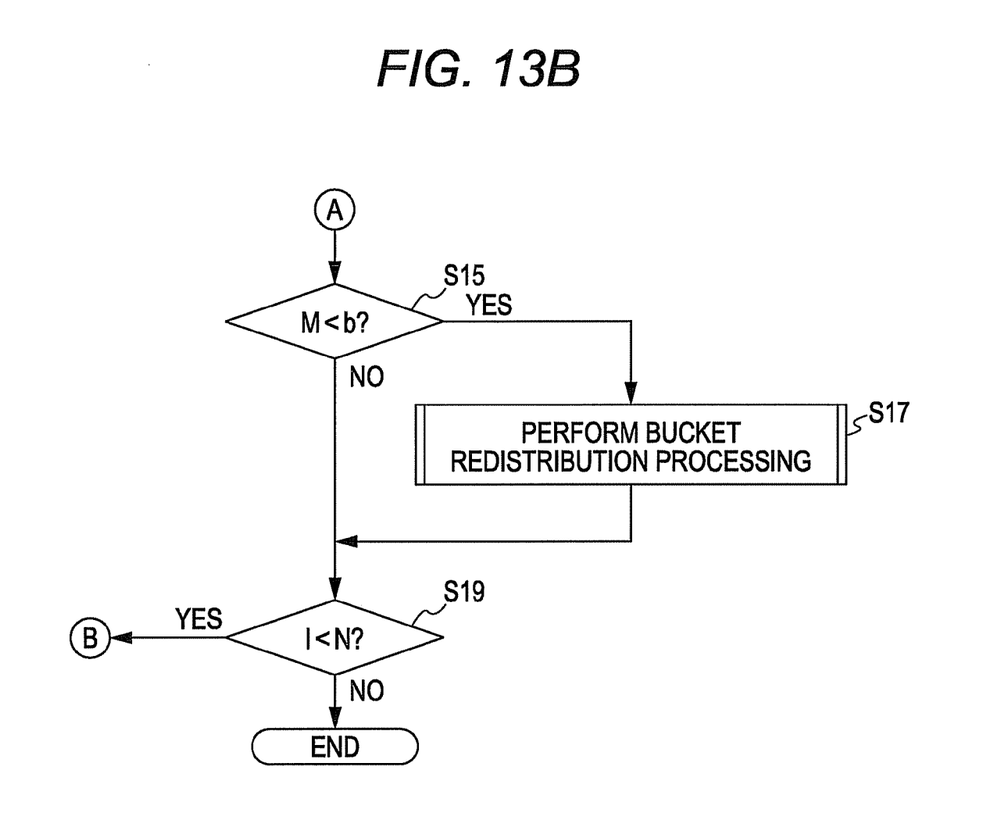

After shifting to the processing described in FIG. 13B, the rule learning part 5 judges whether or not "b" is more than "M" (at S15). When "b" is less than or equal to "M", whether "I" is smaller than "N" or not is judged (at S19). When "I" is smaller than "N", the processing returns to S5. Meanwhile, when "I" is not less than "N", the processing is terminated.

In the above example, the processing then shifts to the processing for the bucket 2. When each gain of the rule candidates "c" and "d" included in the bucket 2 is calculated, the values in FIG. 8 are obtained. According to this calculation, the rule candidate "d" is selected as the rule "h2".

Next, the confidence value of the rule "d" is calculated in accordance with the formula (7), whereby −0.81 is obtained. When the weight of the training example at the next stage is calculated in accordance with the formula (6), using the rule "d" and the confidence value −0.81, the value in FIG. 9 is obtained. The processing results described above are substantially the same as the results described in the background art.

Meanwhile, when "b" is more than "M", the rule learning part 5 performs the bucket redistribution processing (at S17). The bucket redistribution processing will be described using FIG. 14.

Figure 14:
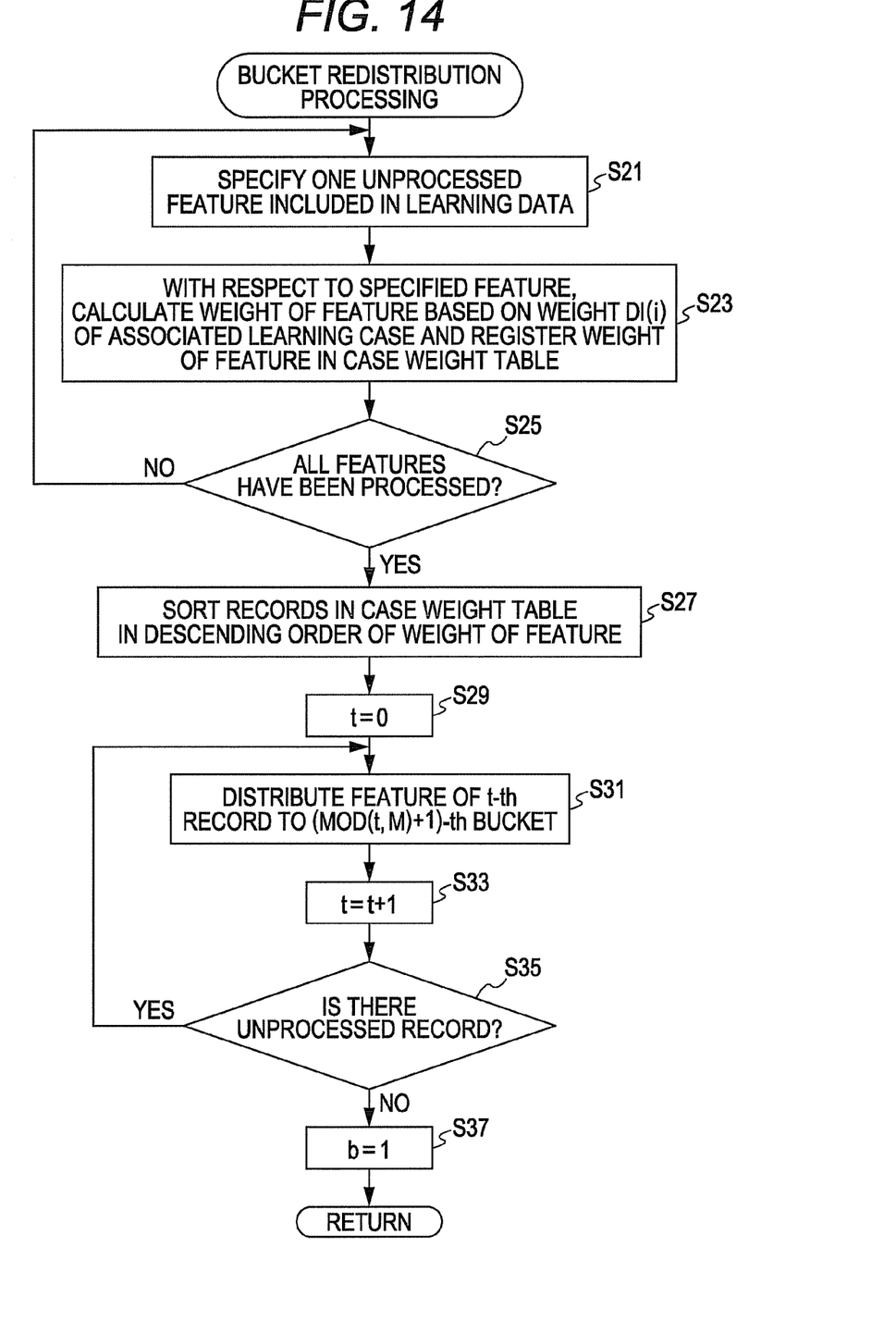
FIG. 14 is a processing flow chart of a bucket redistribution processing.

First, the rule learning part 5 specifies one unprocessed feature included in the learning data stored in the learning data storage unit 3 (at S21). The rule learning part 5 calculates the weight of the feature from the weight "DI(i)" of the associated training example (that is, the weight regarding the training example where the specified feature is included in the feature set) and registers the weight of the feature in a case weight table (at S23). Thereafter, it is judged whether all features included in the learning data are processed or not (at S25). When there is an unprocessed feature, the processing returns to S21. When all features are processed, the processing shifts to S27.

Figure 15:
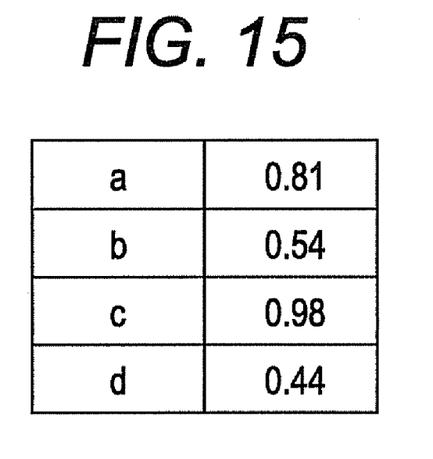
FIG. 15 is an example of the weights of the features calculated by the bucket redistribution processing.
Figure 16:
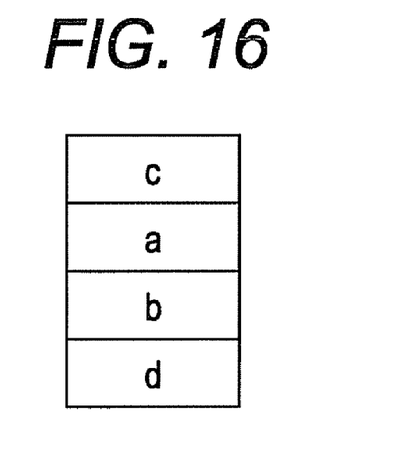
FIG. 16 is a sorting result based on the weights of the features.
Figure 17:
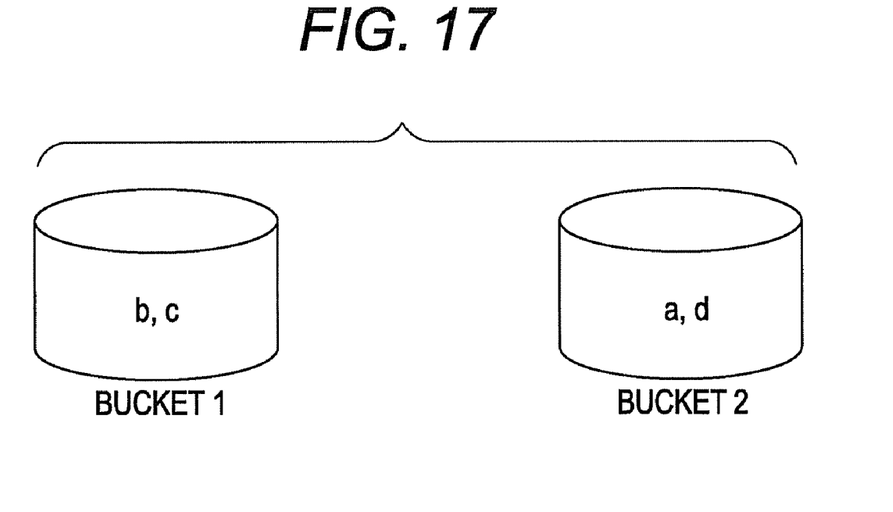
FIG. 17 is a bucket redistribution result.

Based on the values of FIG. 9, when each weight of the features "a", "b", "c" and "d" is calculated, the case weight table in FIG. 15 is obtained. The weight of the feature "a" is 0.27+0.27+0.27=0.81. The weight of the feature "b" is 0.27+0.27=0.54. The weight of the feature "c" is 0.27+0.44+0.27=0.98. The weight of the feature "d" is 0.44.

The rule learning part 5 then sorts the records in the case weight table in descending order based on the weights of the features (at S27). When the case weight table in FIG. 15 is sorted, those features are arranged in the order of "c", "a", "b", and "d" as in FIG. 16.

The rule learning part 5 then initializes a counter "t" to 0 (at S29) and distributes the feature of a "t"-th record to a (MOD(t, M)+1)-th bucket (at S31).

MOD(t,M) is the residue of "t" with "M" as a modulus and a remainder of "t/M". When t equals 0, and 1 is divided by 2, the remainder is 0. Thus, the feature "c" is distributed to the bucket 1 (=0+1).

The rule learning part 5 then increments "t" by one (at S33) and judges whether there is an unprocessed record in the case weight table (at S35). When an unprocessed record exists, the processing returns to S31.

Next, the feature "a" is distributed to the bucket 2, the feature "b" is distributed to the bucket 1, and the feature "d" is distributed to the bucket 2. Thus, as in FIG. 17, the features "b" and "c" are distributed to the bucket 1, and the features "a" and "d" are distributed to the bucket 2.

When there are no unprocessed records, "b" is reset to 1, and the processing goes to S19 (at S37).

Figure 18:
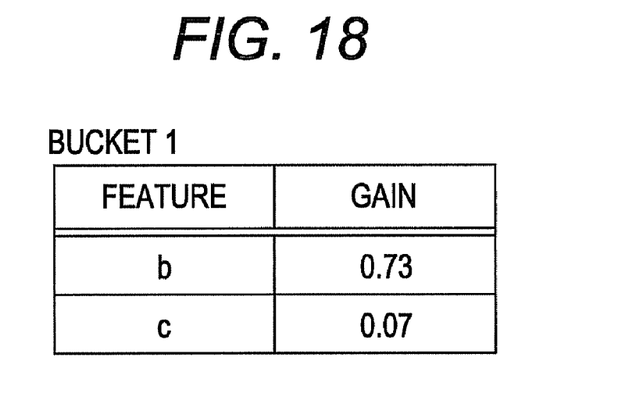
FIG. 18 is a result of calculation of a gain in the bucket 1 in a third Boosting round.

When the processing returns to S5 in FIG. 13A, the feature with the maximum gain is selected from the bucket 1, and, as in FIG. 18, the gain is calculated based on the state of the weights of the training examples of FIG. 9. As in FIG. 18, the feature "b" has the maximum gain, and therefore, the feature "b" is selected. When the reconfiguration of the bucket as in the background art is not performed, the features "a" and "c" are repeatedly selected, and the feature "b" is not selected. However, in the present embodiment, the feature "b" is selected, whereby the bias of learning is eliminated. Since similar learning is applied to substantially the same training examples, reproducibility is realized.

A test is often performed when changing the kind of the feature in order to select the appropriate feature. However, if there is no reproducibility, whether the feature should be changed or not cannot be properly judged, and therefore, the reproducibility is desired.

This invention is not limited to the above embodiment. For example, the functional block diagram of FIG. 12 is an example, and does not necessarily correspond to an actual program module.

Further, as long as the substantially same effect is obtained, the order of the processing may be changed, and the processing may be performed in parallel.

Furthermore, this invention may be applied to boosting algorithms using other weak learners. For example, an example of another weak learner is the C4.5 algorithm (see, for example, C4.5: Programs for Machine Learning, Morgan Kaufmann Series in Machine Learning, J. Ross Quinlan, Morgan Kaufmann, pages 17-26, 1993). C4.5 learns the weak hypothesis in the form of a decision tree (that is, a rule). Since only the features in a specified bucket are used as candidates learning a first node constituting the decision tree, this invention may be applied to the C4.5. The rest of processing is the substantially same as the normal C4.5 algorithm.

Furthermore, even in boosting algorithms using a weak learner to classify trees or graphs, since the feature to be first calculated is limited to what exists in a specified bucket, this invention may be applied to such boosting algorithms.

For example, related documents include the following: Taku Kudo and Yuji Matsumoto, "A Boosting Algorithm for Classification of Semi-Structured Text", Proceedings of EMNLP 2004, pages 301-308, 2004; and Taku Kudo, Eisaku Maeda and Yuji Matsumoto, "An Application of Boosting to Graph Classification", Proceedings of NIPS 2004, pages 729-736, 2005.

As described above, the bucket is reconfigured based on the weight of the training example, whereby the reproducibility of learning may be realized without occurrence of the bias of the selected features.

The feature distribution may, with respect to each features included in the training example, calculate the weight of the relevant feature according to the weight of the training example, may sort each feature in descending order based on a value of the weight of the feature, and may distribute each feature to each of a given number of the buckets in the sorted order. According to this feature distribution, the bucket is appropriately reconfigured in response to the weight of the current training example.

The weight of the feature described above may be the sum of the weights of the training examples where the relevant feature appears.

Further, the gain described above may be calculated by an absolute value of a difference between the square root of the sum of the weights of the training examples with a label of +1 where the feature to be processed appears, and the square root of the sum of the weights of the training examples with a label of −1 where the feature to be processed appears.

The above method may be performed by a combination of a computer and a program executed by the computer. The program may be stored in a storage medium, such as a flexible disk, a CD-ROM, a magnetic optical disk, a semiconductor memory, or a hard disk, or a storage device. Alternatively, the program may be distributed as a digital signal through a network. An intermediate processing result may be temporarily stored in a storage device such as a main memory.

Figure 19:
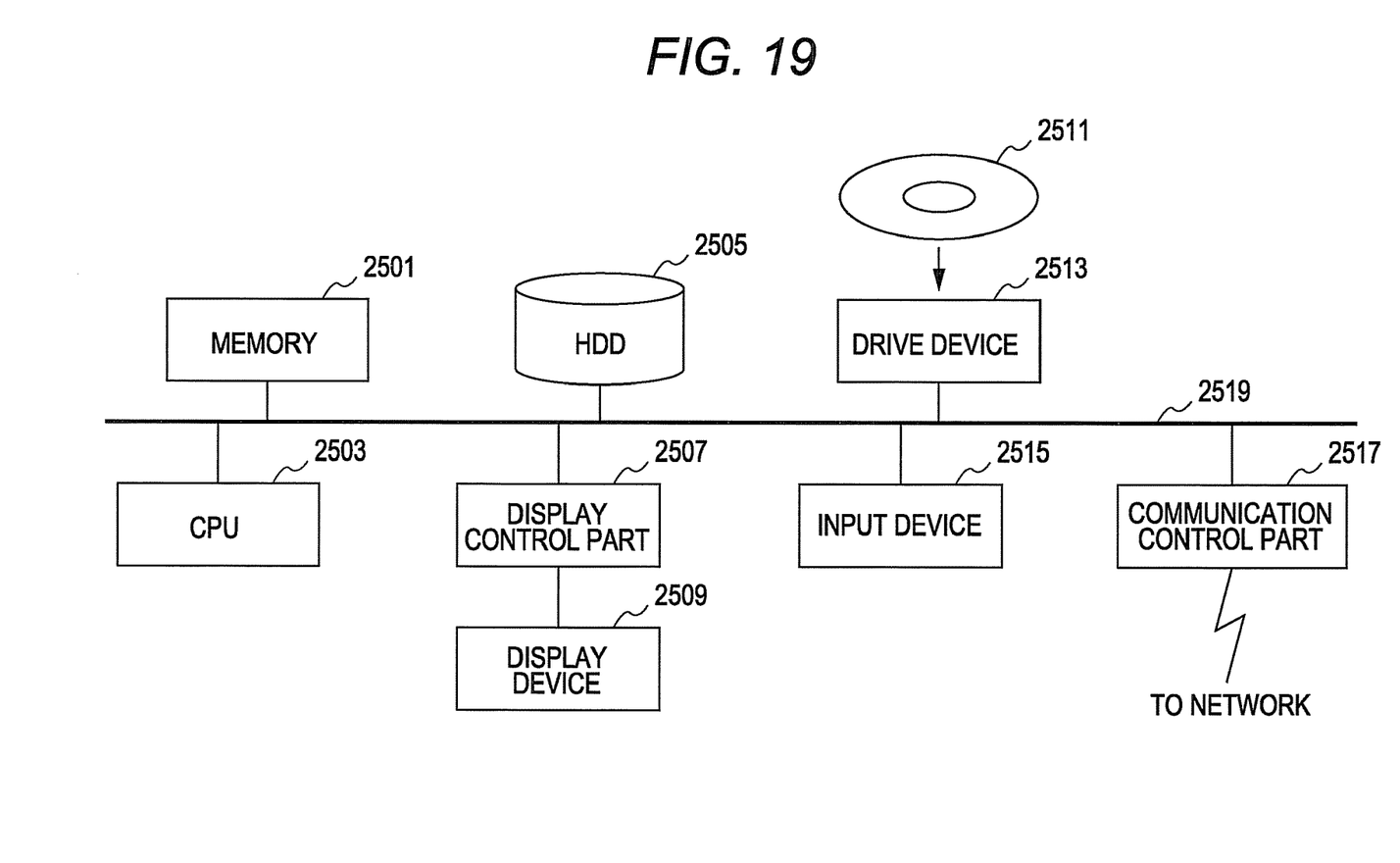
FIG. 19 is a block diagram of a computer.

The above embodiment is a computer device, and as depicted in FIG. 19, a memory 2501, a CPU 2503, a hard disk drive (HDD) 2505, a display control part 2507 connected to a display device 2509, a drive device 2513 for a removable disk 2511, an input device 2515, and a communication control part 2517 for network connection are connected to each other through a bus 2519. An operating system (OS) and an application program for performing the processing of the present embodiment are stored in the HDD 2505. When the OS and the application program are executed by the CPU 2503, they are read from the HDD 2505 to the memory 2501. The CPU 2503 controls the display control part 2507, the communication control part 2517, and the drive device 2513 to perform various operations. The data under processing may be stored in the memory 2501, or may be stored in the HDD 2505. In the present embodiment, an application program for executing the above processing is stored in the removable disk 2511 and distributed so that the application program may be installed in the HDD 2505l from the drive device 2513. The application program may also be installed in the HDD 2505 through a network, such as the internet, and the communication control part 2517. The computer device may realize the above functions by cooperation between hardware such as the CPU 2503 and the memory 2501, and the OS and an application program.

What is claimed is:

1. A rule learning method, which makes a computer execute a rule learning processing in machine learning, the method comprising:
    calculating weights of features, registered in a training example data storage unit storing a plurality of training examples correlated with one or a plurality of the features, based on a weight of each training example correlated with each of the features;
    sorting the features in descending order of the weights of the features;
    distributing the features to a given number of buckets in the descending order;
    specifying a maximum gain value feature in a bucket as a specified rule, where a gain of each feature in the bucket is calculated based on the weight of each training example which includes that feature;
    calculating a confidence value of the specified rule based on the weight of a correlated training example;
    storing a combination of the specified rule and the confidence value in a rule data storage unit;
    updating weights of the training examples based on the specified rule, the confidence value of the specified rule, data of the training examples, and the weights of the training examples; and
    repeating the distributing, the specifying, the calculating, the storing, and the updating, when the rule and the confidence value are to be further generated after the updating is applied to all the buckets.

2. The rule learning method according to claim 1, wherein the weight of each feature is a sum of the weights of the training examples correlated with the feature.

3. The rule learning method according to claim 1, wherein, each training example is correlated with a label showing whether the training example is true or false, and the gain is calculated with respect to associated training examples correlated with a given feature by an absolute value of a difference between a square root of the sum of the weights of the associated training examples correlated with the label showing true and a square root of the sum of the weights of the training examples correlated with the label showing false.

4. A non-transitory storage medium storing a rule learning program, which when executed by a computer, causes the computer to perform a method, the method comprising:
    calculating weights of features, registered in a training example data storage unit storing a plurality of the training examples correlated with one or a plurality of the features, based on a weight of each training example correlated with each of the features;
    sorting the features in descending order of the weights of the features;
    distributing the features to a given number of buckets in the descending order;
    specifying a maximum gain value feature in a bucket as a specified rule, where a gain of each feature in the bucket is calculated based on the weight of each training example which includes that feature;
    calculating a confidence value of the specified rule based on the weight of a correlated training example;
    storing a combination of the specified rule and the confidence value in a rule data storage unit;
    updating weights of the training examples based on the specified rule, the confidence value of the specified rule, data of the training examples, and the weights of the training examples; and
    repeating the distributing, the specifying, the calculating, the storing, and the updating, when the rule and the confidence value are to be further generated after the updating is applied to all the buckets.

5. A rule learning device comprising:
    a training example data storage unit which stores a plurality of training examples correlated with one or a plurality of the features, and the weight of each training example;
    a processor which
        calculates weights of features based on a weight of each training example correlated with each of the features which are registered in said training example data storage unit,
        sorts the features in descending order of the weights of the features;
        distributes the features to a given number of buckets in the descending order;
        specifies a maximum gain value feature as a specified rule, where a gain of each feature in the bucket is calculated based on the weight of each training example which includes that feature, and
        calculates a confidence value of the specified rule based on the weight of a correlated training example;
    a rule data storage unit which stores a combination of the specified rule and the confidence value; and
    an updating unit which updates weights of the training examples based on the specified rule, the confidence value of the specified rule, data of the training examples, and the weights of the training examples; and
    a repeating unit which repeats the distributing, the specifying, the calculating, the storing, and the updating, when the rule and the confidence value are to be further generated after the updating is applied to all the buckets.

* * * * *